(12) United States Patent
Dang et al.

(10) Patent No.: US 7,280,459 B2
(45) Date of Patent: Oct. 9, 2007

(54) DEVICE FOR CORRECTING SIGNAL MODULATIONS

(75) Inventors: Lieu-Kim Dang, Schaan (LI); Heinz-Jörg Schröder, Le Chevalon de Voreppe (FR)

(73) Assignee: Thomson Licensing, Boulogne-Billancourt (FR)

( * ) Notice: Subject to any disclaimer, the term of this patent is extended or adjusted under 35 U.S.C. 154(b) by 557 days.

(21) Appl. No.: 10/403,111

(22) Filed: Mar. 31, 2003

(65) Prior Publication Data
US 2003/0189887 A1    Oct. 9, 2003

(30) Foreign Application Priority Data
Apr. 3, 2002    (DE) ................... 102 14 775

(51) Int. Cl.
*G11B 7/00*    (2006.01)
(52) U.S. Cl. ................ 369/112.17; 369/112.19; 369/112.28
(58) Field of Classification Search .............. None
See application file for complete search history.

(56) References Cited

U.S. PATENT DOCUMENTS

| | | | | |
|---|---|---|---|---|
| 4,771,414 A | * | 9/1988 | Yoshimatsu | 369/110.04 |
| 4,951,274 A | * | 8/1990 | Iwanaga et al. | 369/44.11 |
| 5,005,162 A | * | 4/1991 | Mitsumori et al. | 369/44.12 |
| 5,189,655 A | * | 2/1993 | Ogata et al. | 369/44.23 |
| 5,251,198 A | * | 10/1993 | Strickler | 369/94 |
| 5,515,353 A | * | 5/1996 | Miyazaki et al. | 369/112.04 |
| 5,694,385 A | | 12/1997 | Takahashi et al. | 369/112 |
| 5,841,745 A | | 11/1998 | Kuhn et al. | 369/44.23 |
| 6,249,493 B1 | * | 6/2001 | Dang | 369/44.23 |
| 6,339,564 B2 | * | 1/2002 | Tezuka et al. | 369/44.23 |
| 6,341,116 B1 | | 1/2002 | Lee et al. | 369/112.02 |
| 6,343,059 B1 | * | 1/2002 | Lee et al. | 369/112.28 |
| 6,538,975 B1 | * | 3/2003 | Suh et al. | 369/112.17 |
| 6,639,888 B1 | * | 10/2003 | Hasegawa | 369/112.16 |

OTHER PUBLICATIONS

Mutze, Karl : ABC der Optik, Verlag Werner Dausien, Hanau, Main, Abshnitt "POLARISATIONSPIRSMA" 1972, S. 694-697.
DE Search Report Deutsches Patent—und Markenamt Sep. 4, 2002.

* cited by examiner

*Primary Examiner*—William Korzuch
*Assistant Examiner*—Christopher Lamb
(74) *Attorney, Agent, or Firm*—Joseph J. Laks; Robert B. Levy

(57) ABSTRACT

A device for reading from and/or writing to optical recording media 10, on which information is present in the form of pits, with a linearly polarized light beam 2.

A device for reading from and/or writing to optical recording media 10 which ensures correct reproduction of the stored data even when the recording medium influences the polarization of the light beam 2. This is achieved by virtue of the fact that a device for reading from and/or writing to optical recording media 10 with a light beam 2 which is linearly polarized in a first direction of polarization has a beam-splitting element 40 for splitting the light beam 2 into partial beams 21, 22, 23 in accordance with the first and a second direction of polarization, perpendicular to the first direction of polarization, and that it has a partly reflecting element 3, which directs both the partial beam 21 of the first direction of polarization and the partial beam 22, 23 of the second direction of polarization onto a detector unit 9, which has separate detector elements 91, 92, 93 for the partial beams 21, 22, 23 of the two directions of polarization.

6 Claims, 1 Drawing Sheet

DEVICE FOR CORRECTING SIGNAL MODULATIONS

FIELD OF THE INVENTION

The present invention relates to a device for reading from and/or writing to optical recording media, on which information is present in the form of pits.

BACKGROUND OF THE INVENTION

Devices of this type are used for example for reading from and/or writing to compact discs (e.g. CD, CD-R, CD-RW, . . . ) or digital versatile discs (inter alia DVD, DVD-ROM, DVD-RAM, DVD+RW, DVD-RW, . . . ) on which information is present in the form of structures with a deviating reflection behaviour, so-called pits. For this purpose, usually a laser diode emits a linearly polarized light beam which passes through a polarization beam splitter cube and is collimated with the aid of a collimator lens. After the polarization beam splitter cube, the light beam passes through a quarter-wave plate, by which it is circularly polarized, and is focussed onto the recording medium by a converging lens. A part of the light beam is reflected from the recording medium, the intensity of the reflected light beam depending on whether or not the light beam was focussed onto a pit. The reflected light beam is collimated by the converging lens and once again passes through the quarter-wave plate, so that it is linearly polarized again. After passing through the quarter-wave plate twice, the direction of polarization of the reflected light beam is perpendicular to the direction of polarization of the incident light beam, so that the reflected light beam is reflected from the polarization beam splitter cube. Via the polarization beam splitter cube, the light beam is therefore focussed by a collimator lens onto a detector unit which determines the change in the intensity of the reflected light beam and thus generates a data signal which reproduces the sequence of pits on the recording medium. A track error signal and a focus error signal are additionally generated with the aid of the reflected light beam.

The devices according to the prior art have the disadvantage that undesirable modulations can occur in the said signals if the recording medium itself influences the polarization of the light beam, but this influence varies in magnitude for different regions of the recording medium. Such an influence on the polarization is caused, for example, by birefringence, which is brought about by the orientation of the molecules, strains or inclusions in the material of the recording medium, but also by the reflection of the light beam at the information-carrying metal layer. The reflected light beam is elliptically polarized by the birefringence. Since only that component of the reflected light beam whose polarization is perpendicular to the polarization of the incident light beam is reflected from the polarization beam splitter cube, the influence on the polarization caused by the recording medium leads to a modulation of the intensity of the light beam incident on the detector unit. This can lead to problems when reading out the stored data if the modulations exceed predetermined tolerances.

Therefore, it is an object of the invention to propose a device for reading from and/or writing to optical recording media which avoids the abovementioned problems and ensures correct reproduction of the stored data.

SUMMARY OF THE INVENTION

According to the invention, the object is achieved by virtue of the fact that a device for reading from and/or writing to optical recording media with a light beam which is linearly polarized in a first direction of polarization, information being stored in the form of pits on the recording medium, has a beam-splitting element for splitting the light beam into partial beams in accordance with the first and a second direction of polarization, perpendicular to the first direction of polarization, and that it has a partly reflecting element, which directs both the partial beam of the first direction of polarization and the partial beam of the second direction of polarization onto a detector unit, which has separate detector elements for the partial beams of the two directions of polarization. The birefringence means that the light beam reflected from the recording medium is elliptically polarized and has varying components of different magnitude in both mutually perpendicular directions of polarization. The device according to the invention directs the components of both directions of polarization onto the corresponding detector elements, so that the components of both directions of polarization are detected. The elliptical polarization of the reflected light beam results in intensity fluctuations on the detector elements. The solution according to the invention makes it possible to ascertain whether the intensity fluctuations are caused by the recording medium or else by the pits present on the recording medium. If the intensity decreases on the detector element for one direction of polarization and increases on the detector element for the other direction of polarization, then the fluctuation is caused by the recording medium. By contrast, if the intensity decreases or increases on both detector elements, then the fluctuation is caused by the pits present. A further advantage of using separate detector elements for both directions of polarization is that such a device is additionally able to read from recording media on which information is stored in the form of magnetic domains.

According to the invention, the device has a polarization-influencing element, which changes the polarization of the light beam and through which the light beam passes before impinging on the recording medium and after reflection from the recording medium. The change in the polarization may be, by way of example, a rotation of the direction of polarization or the conversion of the linear polarization into an elliptical or preferably circular polarization. If the polarization-influencing element converts the linear polarization into a circular polarization, then the reflected light beam, after once again passing through the polarization-influencing element, again has a linear polarization which is rotated by 90° relative to the polarization of the original light beam. In this case, a large part of the light beam reflected from the recording medium is present in a direction of polarization which is perpendicular to the direction of polarization originally emitted by the laser diode. The partly reflecting element can be optimized for this direction of polarization. The remaining component of the light beam in the second direction of polarization largely originates from the birefringence of the recording medium.

According to the invention, the polarization-influencing element is a quarter-wave plate. This is advantageous since a quarter-wave plate is a standard optical component which is inexpensive to obtain.

The polarization-rotating element and the beam-splitting element advantageously form a unit. As a result, the complicated adjustment of the elements relative to one another in the beam path can be obviated, thereby reducing the production costs of a device according to the invention.

According to the invention, the element for splitting the light beam in accordance with the directions of polarization is a birefringent element. This enables a simple arrangement of the element in the beam path. Since the light beam emitted by the laser diode is polarized exclusively in a first direction of polarization, it is not influenced when passing through the birefringent element on the way to the recording medium. Only the light beam which is reflected from the recording medium and in which both directions of polarization are present is split into partial beams in accordance with the directions of polarization by the birefringent element.

In accordance with a further aspect of the invention, the birefringent element has two oppositely arranged Rochon prisms. With an arrangement of this type, not only is the light beam which is reflected from the recording medium split into two partial beams in accordance with the direction of polarization, at the same time the component of a direction of polarization is also split into two further partial beams. The latter can be directed onto separate detector elements and allow a minimization of the crosstalk of a track error that may be present onto a focus error signal obtained from the detector signals. In particular when using the astigmatism method for obtaining a focus error signal from the partial beam of a direction of polarization, there arise in part complex diffraction patterns on the associated detector element which, even in the event of slight displacement of the light beam incident on the detector element relative to the optical axis, exercise undesirable interfering influences on the signals derived from the output signals of the detector element. The use of two oppositely arranged Rochon prisms prevents the superposition—caused by a track error—of the partial beams of both directions of polarization on the detector elements.

The partly reflecting element advantageously has different reflection factors for the first and second directions of polarization. In this way, the device can be adapted to different requirements. If the light beam emitted by the laser diode is polarized in the first direction of polarization, the partly reflecting element may have, by way of example, a reflection factor of 10% for the first direction of polarization, while it has a reflection factor of 100% for the second direction of polarization. In this way, only small losses arise when the light beam emitted by the laser diode passes through the partly reflecting element. Since the direction of polarization of the reflected light beam is rotated by the quarter-wave plate by 90° relative to the direction of polarization of the incident light beam, virtually the entire reflected light beam reaches the associated detector element, so that a maximum intensity is obtained on the detector element. At the same time, a sufficiently large proportion of the component originating from the birefringence of the recording medium in the first direction of polarization reaches the corresponding detector element.

If the reflection factor for the first direction of polarization is increased, for example to 50%, although the intensity of the component in the second direction of polarization decreases on the associated detector element, at the same time a larger proportion of the component originating from the birefringence of the recording medium in the first direction of polarization reaches the corresponding detector element.

An apparatus for reading from and/or writing to optical recording media advantageously uses a device according to the invention. Such an apparatus has the advantage that firstly it can read both from recording media on which information is stored in the form of pits and from recording media on which information is stored in the form of magnetic domains. Furthermore, such an apparatus is distinguished by a reduced error rate when reading from the said recording media.

It goes without saying that combinations of advantageous features likewise lie within the scope of validity of the invention.

BRIEF DESCRIPTION OF THE DRAWINGS

In order to provide a better understanding, the invention will be explained below with reference to FIGS. 1 and 2, in which.

DETAILED DESCRIPTION OF PREFERED EMBODIMENTS

Figure 1:
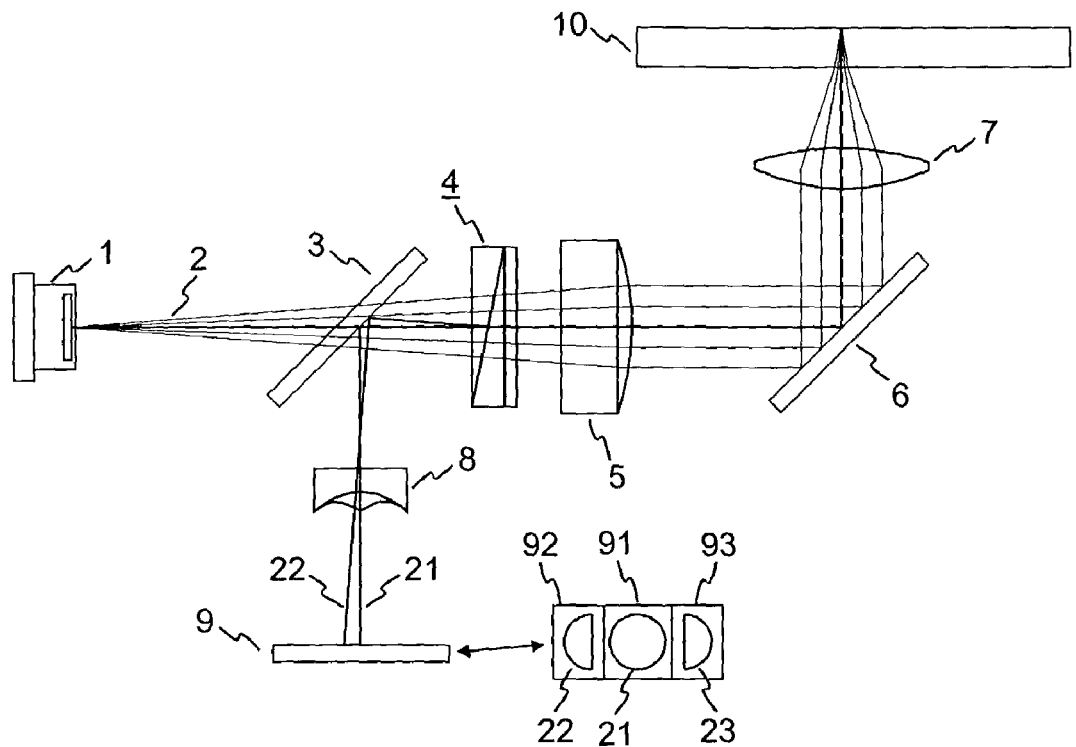
FIG. 1 shows a device according to the invention for reading from and/or writing to optical recording media.

FIG. 1 diagrammatically shows a device for reading from and/or writing to optical recording media according to the invention. A laser diode 1 emits a linearly polarized light beam 2, which passes through a partly reflecting element 3 and a unit 4 comprising a beam-splitting element 40 and a quarter-wave plate 41, before it is collimated by a collimator lens 5. The unit 4 is arranged relative to the direction of polarization of the light beam 2 in such a way that the Rochon prisms 42, 43 of the beam-splitting element 40 do not influence the light beam 2, the quarter-wave plate 41 bringing about a circular polarization. The light beam 2 is focussed onto a recording medium 10 via a deflection mirror 6 and a focussing lens 7. The light beam 2 reflected from the recording medium 10 is collimated by the focussing lens 7 and directed in the direction of the collimator lens 5 by the deflection mirror 6, the said collimator lens focussing the said beam onto the detector unit 9 via the partly reflecting mirror 3. In this case, the reflected light beam 2 once again passes through the unit 4, so that it is linearly polarized again on account of the quarter-wave plate 41. After passing through the quarter-wave plate 41 twice, the direction of polarization of the reflected light beam 2 is perpendicular to the direction of polarization originally emitted by the laser diode 1. The birefringence of the recording medium 10 means that the reflected light beam is no longer polarized circularly, however, but rather elliptically. Therefore, a varying component in the original direction of polarization is also present. The two Rochon prisms 42, 43 split the reflected light beam 2 into an ordinary partial beam 21 and an extraordinary partial beam in accordance with the directions of polarization, the extraordinary partial beam once again being split into two partial beams 22, 23 by the specific arrangement of the Rochon prisms. To improve clarity, the second extraordinary partial beam 23 is not illustrated in the figure. The three partial beams 21, 22, 23 pass through a cylindrical lens 8, which is required for obtaining a focus error signal in accordance with the astigmatism method, and impinge on three different detector elements 91, 92, 93 of the detector unit 9. Depending on the application, the three detector elements 91, 92, 93 can be subdivided into further partial regions. The splitting of the extraordinary partial beam into two partial beams 22, 23 by the two Rochon prisms ensures that there is no overlapping of the partial beams 21, 22, 23 on the detector elements 91, 92, 93.

Figure 2:
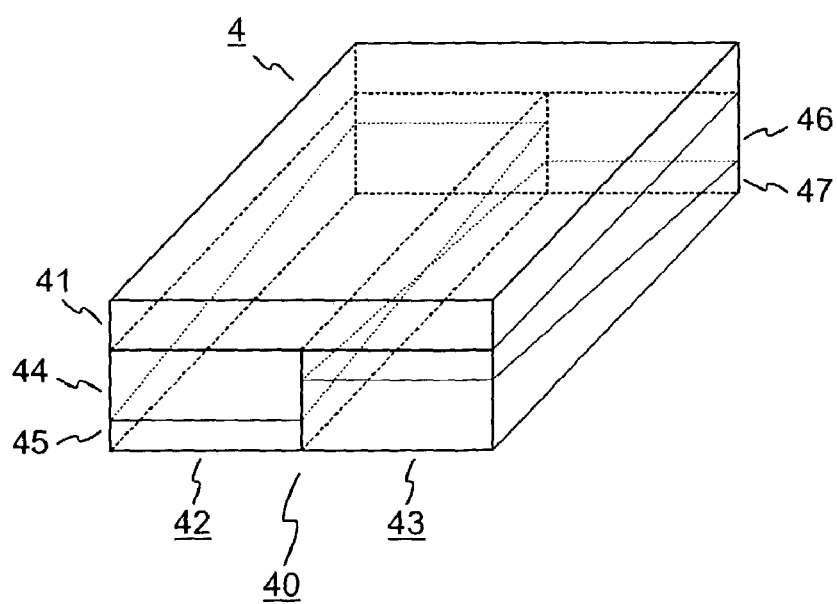
FIG. 2 shows a unit comprising two Rochon prisms and a quarter-wave plate.

FIG. 2 shows the unit 4 comprising two Rochon prisms 42, 43 and the quarter-wave plate 41 once again in detail. The Rochon prisms 42, 43 in each case comprise two quartz wedges 44, 45 and 46, 47, respectively, which are cemented together to form a beam-splitting element 40 and whose crystal axes are arranged in such a way that an extraordinary ray is refracted at the boundary between the wedges, while an ordinary ray remains unaffected. The beam-splitting element 40 comprising the two Rochon prisms 42, 43 is cemented to the quarter-wave plate 41 to form a unit 4. In order to avoid reflection losses, the top side and the underside of the unit 4 are provided with an anti-reflection coating.

What is claimed is:

1. Device for reading from and/or writing to optical recording media with a light beam which is linearly polarized in a first direction of polarization, information being stored in the form of pits on the optical recording medium, the device comprising:
   a birefringent beam-splitting element having two oppositely arranged Rochon prisms for splitting the light beam into partial beams in accordance with the first and a second direction of polarization, perpendicular to the first direction of polarization, the second direction of polarization being introduced into the light beam by the optical recording medium,
   partly reflecting element, which directs both the partial beam of the first direction of polarization and the partial beam of the second direction of polarization onto a detector unit, which has separate detector elements for the partial beams of the two directions of polarization, and
   a quarter-wave plate which changes the polarization of the light beam and through which the light beam passes before impinging on the recording medium and after reflection from the recording medium.

2. Device according to claim 1, wherein the quarter-wave plate and the beam-splitting element form a unit.

3. Device for reading from and/or writing to optical recording media with a light beam which is linearly polarized in a first direction of polarization, information being stored in the form of pits on the optical recording medium, the device comprising:
   a beam-splitting element for splitting the light beam into partial beams in accordance with the first and a second direction of polarization, perpendicular to the first direction of polarization, the second direction of polarization being introduced into the light beam by the optical recording medium.
   a detector unit, which has separate detector elements for the partial beams of the two directions of polarization,
   a partly reflecting clement having different reflection factors for the first and second directions of polarization, which directs both the partial beam of the first direction of polarization and the partial beam of the second direction of polarization onto the detector unit, and through which the light beam passes before impinging on the recording medium and on which the light beam impinges alter reflection from the recording medium, and
   a quarter-wave plate which changes the polarization of the light beam and through which the light beam passes before impinging on the recording medium, and after reflection from the recording medium.

4. Device according to claim 3, wherein the quarter-wave plate and the beam-splitting element form a unit.

5. Device according to claim 3, wherein the beam-splitting element for splitting the light beam in accordance with the directions of polarization is a birefringent element.

6. Device according to claim 5, wherein the birefringent element has two oppositely arranged Rochon prisms.

* * * * *